United States Patent

Kohama et al.

[11] Patent Number: 5,282,113
[45] Date of Patent: Jan. 25, 1994

[54] MEMORY CARD WITH A PLURALITY OF CONTACT SPACES

[75] Inventors: Kyoichi Kohama, Toride; Yoshio Imai, Mitsukaido; Tomotaka Ozeki, Toride, all of Japan

[73] Assignee: Hitachi Maxell, Ltd., Osaka, Japan

[21] Appl. No.: 970,222

[22] Filed: Nov. 2, 1992

Related U.S. Application Data

[63] Continuation of Ser. No. 665,589, Mar. 5, 1991, abandoned.

[30] Foreign Application Priority Data

Mar. 5, 1990 [JP] Japan .................................... 2-51882

[51] Int. Cl.⁵ .................... G06K 19/067; H05K 7/14; H05K 5/03
[52] U.S. Cl. .................................... 361/737; 235/492; 235/495; 257/679; 361/728; 361/730; 361/684
[58] Field of Search .............. 235/492, 495; 361/392, 361/394, 395, 399; 364/708; 439/59, 60, 61, 68; 257/679

[56] References Cited

U.S. PATENT DOCUMENTS

| | | | |
|---|---|---|---|
| 4,532,419 | 7/1985 | Takeda | 235/492 |
| 4,625,102 | 11/1986 | Rebjock et al. | 235/492 |
| 4,682,017 | 7/1987 | Nakahara et al. | 235/492 |
| 4,695,925 | 9/1987 | Kodai et al. | 361/395 |
| 4,737,620 | 4/1988 | Mollet et al. | 235/492 |
| 4,774,633 | 9/1988 | Dehaine et al. | 235/492 |
| 4,835,846 | 6/1989 | Juan et al. | 235/492 |
| 4,843,225 | 6/1989 | Hoppe | 235/492 |
| 5,121,294 | 6/1992 | Sakamoto | 361/394 |

FOREIGN PATENT DOCUMENTS

| | | | |
|---|---|---|---|
| 0032085 | 2/1984 | Japan | 361/395 |
| 62-74697 | 4/1987 | Japan | |
| 62-164691 | 10/1987 | Japan | |

*Primary Examiner*—Leo P. Picard
*Assistant Examiner*—Donald Sparks

[57] ABSTRACT

A memory card having a printed circuit board mounted with semiconductor elements and provided with terminal portions along one side thereof and a card basic board formed with a broad recess on the lower surface thereof for receiving said printed circuit board therein. Void contact spaces are provided along one side thereof. The card basic board is formed with upper openings for communicating with the contact spaces on the upper surface of the card basic board and with inserting ports for communicating with the contact spaces on a side surface of the card basic board. Upper beams are provided between the upper openings and the corresponding inserting ports, and lower beams are provided near the inserting ports.

5 Claims, 4 Drawing Sheets

MEMORY CARD WITH A PLURALITY OF CONTACT SPACES

This application is a continuation of application Ser. No. 07/665,589 filed on Mar. 5, 1991, now abandoned.

BACKGROUND OF THE INVENTION

The present invention relates to a memory card for storing information, in which the information is stored in semiconductor elements accommodated in the card body of the memory card.

FIGS. 5 and 6 show a conventional memory card. As shown in these figures, a printed circuit board 4, which has a plurality of terminal portions 41 along one side of the circuit board, is insert-molded substantially in the middle region of the thickness of a card basic board 3. Along one side portion of the card basic board 3 are formed a plurality of void contact spaces 31 correspondingly to the above-mentioned terminal portions 41. The contact spaces 31 are covered at the upper portions thereof by the upper surface 33 of the card basic body 3, while open at the side portions thereof at inserting ports 34 formed in the side end surface 32 of the card basic board 3.

As shown in FIG. 6, when the memory card 7 is inserted into the aperture 52 of a connector 5, electric contacts 51, each having a long-spun tulip shape and being arranged in the aperture 52 of the connector 5, intrude into the contact spaces 31 through the inserting ports 34, whereby the contacts 51 elastically grasp the above-mentioned terminal portions 41 which are attached to the upper and lower surfaces of the printed circuit board 4, and an electrical connection between the memory card 7 and the connector 5 is achieved.

The above-mentioned conventional memory card has a problem with respect to its operational reliability in that, since the upper portion of the contact space 31 is covered and closed by the upper surface of the card basic board, dust and other foreign substance which adhere to the terminal portion of the terminal 41 of the printed circuit board 4, cannot be easily removed. In consequence, feature between the memory card 7 and the connector 5 may deteriorate and the operational reliability decreased.

SUMMARY OF THE INVENTION

The object of the present invention is to provide a memory card which can solve the abovementioned problem of conventional memory cards and can achieve a high operational reliability.

For achieving the above-mentioned object, the memory card according to the present invention, includes a printed circuit board accommodating a plurality of semiconductor elements having a predetermined number of terminal portions along one side portion thereof and a card basic board formed on the lower side thereof with a broad recess into which the above-mentioned printed circuit board is to be fitted. Formed along one side portion thereof are a predetermined number of void contact apertures communicating with recess. The printed circuit board is fitted into said recess of the card basic board with the terminal portions of the printed circuit board present in the corresponding contact spaces of the card basic board. The memory card characterized in that the card basic board is formed on its upper surface with upper openings communicating with the corresponding contact spaces and on its side surface with inserting ports communicating also with the corresponding contact spaces. An upper beam is formed between each of the upper openings and the corresponding inserting port and a lower beam is formed near each of the inserting ports.

In the present invention, since the card basic board is formed on its upper surface with upper openings communicating with the corresponding contact spaces as mentioned above, it is possible to visually inspect whether or not any dirt or dust exists on the terminal portions of the printed circuit board. When some foreign matter is found to have adhered to the terminal portion, it can be removed through the inserting port by a vacuum, compressed air, brush or other cleaning apparatus means of a cloth or a blush. In this manner, the can be removed.

Further, by providing an upper beam between each of the upper openings and the corresponding inserting port, namely along an upper side edge of the card basic board where the upper surface of the card basic board joins with the side surface of the same, and a lower beam near each of the inserting ports, namely at the position opposite to the upper beam, the mechanical strength of the card board is increased at near the side edge portion of any significant card basic board, and the deformation of the memory card can be effectively prevented.

BRIEF DESCRIPTION OF THE DRAWINGS

FIG. 1 is a plan view of a memory card according to a preferred embodiment of the present invention, FIG. 2 is a sectional view of the memory card, FIG. 3 is a top perspective view of of the card basic board, FIG. 4 is a side sectional view of the memory card is inserted into a connector, FIG. 7 is a perspective sectional view, similar to FIG. 4, but modified with respect to the lower beam.

DESCRIPTION OF THE PREFERRED EMBODIMENT

Figure 1:
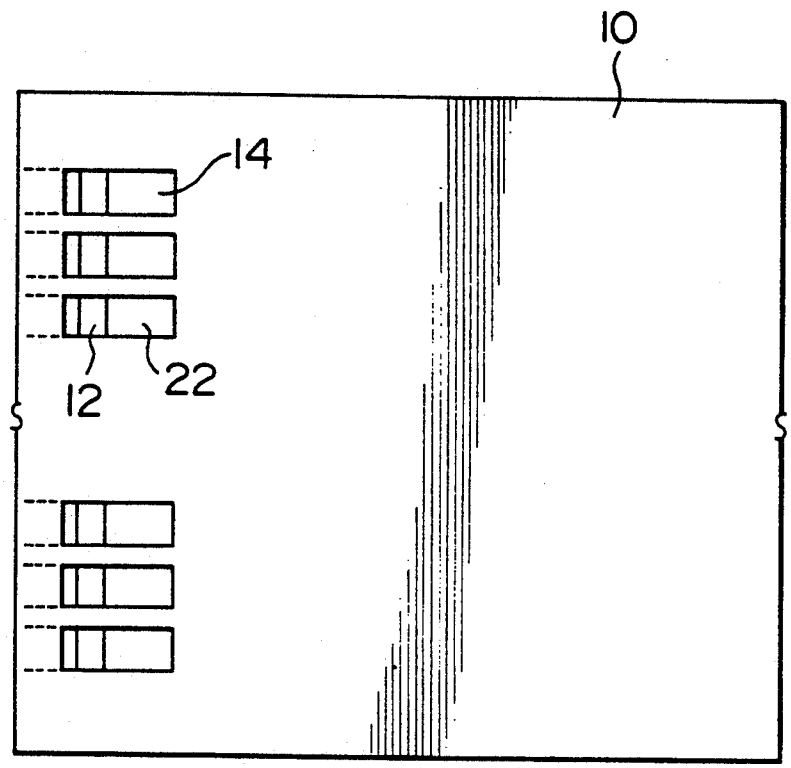
FIGS. 1 to 4 and FIG. 7 are for describing a preferred embodiment of the present invention.

Referring to the drawings, an embodiment of the present invention will be described.

Figure 2:
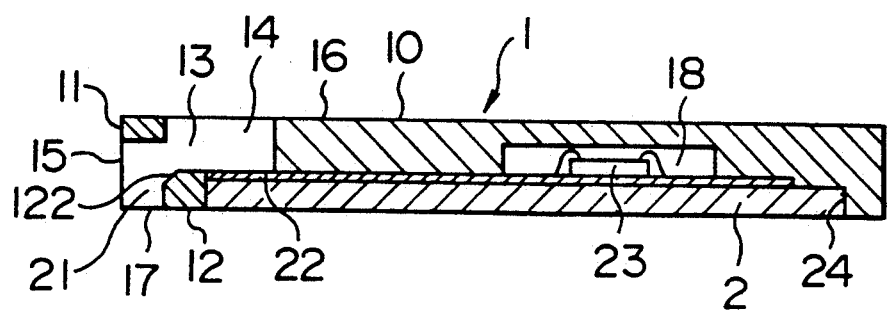
Figure 3:
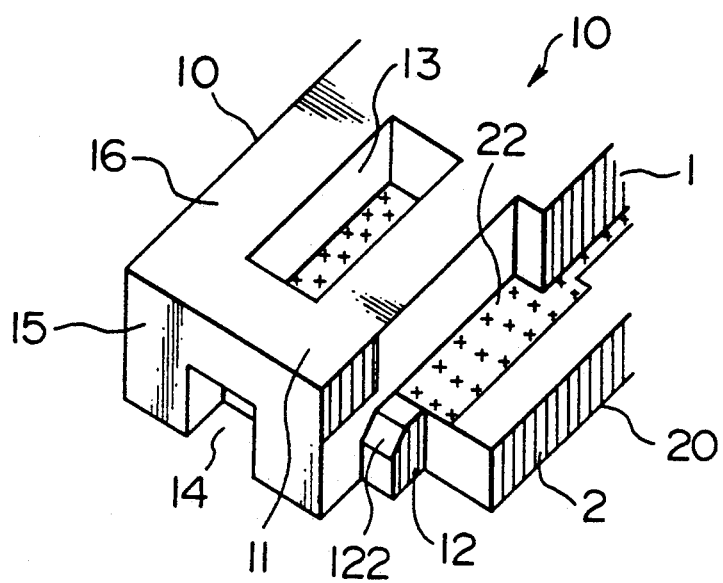
Figure 4:
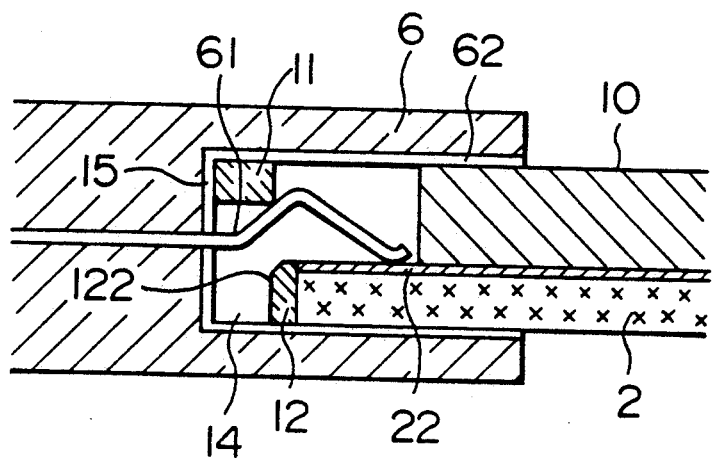
Figure 5:
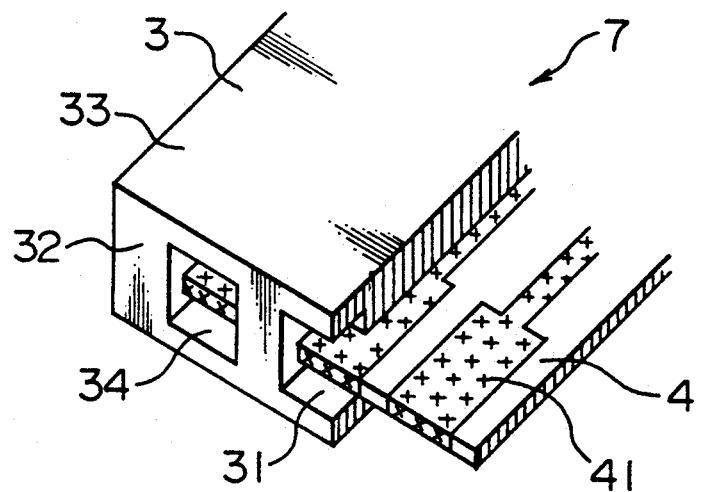
FIG. 5 is a perspective view of a conventional card basic board.
Figure 6:
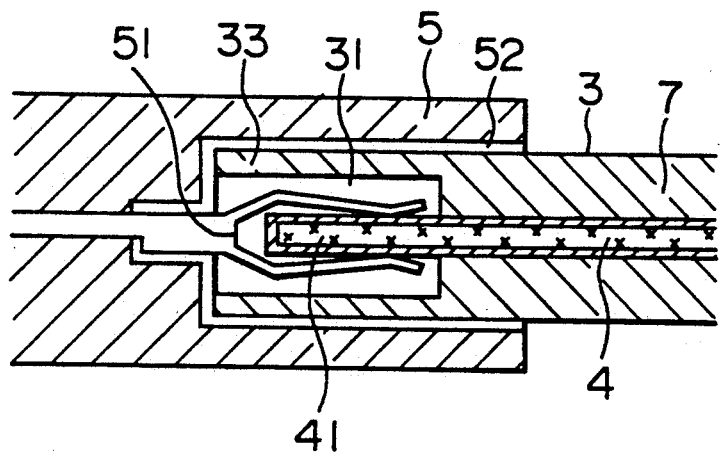
FIG. 6 is a perspective view of a conventional memory card as is inserted into a connector.

FIGS. 1 to 4 illustrate a first embodiment of the present invention, where FIG. 1 is a plan view of a memory card, FIG. 2 is a sectional view of the memory card, FIG. 3 is a top perspective view of the card basic board, and FIG. 4 is a sectional view of the important portion when the memory card is inserted into a connector.

As shown in FIG. 2, the memory card 10 is mainly composed of a card basic board 1 molded from a synthetic resin and a printed circuit board 2.

The card basic board 1 is formed, as shown in FIGS. 2 and 3, near one side portion thereof with contact spaces 14 correspondingly to the number of the terminal portions 22 of the printed circuit board 2. The card basic board 1 is formed at the upper surface 16 thereof with upper openings 13 each communicating with the corresponding contact space 14, while at the side surface 15 of the card basic board 1 with inserting ports 21 each communicating with the corresponding contact space 14.

An upper beam 11 is formed between each upper opening 13 and the corresponding inserting port 21, namely along an upper side edge of the card basic board where the upper surface 16 of the card basic board joins with the side surface 15 of the same, and a lower beam 12 is formed near each of the inserting ports 21, namely at the position slantly downward of the upper beam 11 as opposite to the upper beam 11. Each of the lower beams 12 being formed with a slant surface 122 in order to smoothly insert the cantilever contactor 61.

As shown in FIG. 2, the upper beam 11 and the lower beam 12 are so arranged as not to overlap with each other when viewed from above. This arrangement is intended to utilize the upper opening 13 as a vent hole for the die portion corresponding the lower beam 12, when a segment die is used for molding the card basic board 1.

Further, as shown in FIG. 2, the card basic board 1 is formed at its lower surface 17 with a broad recess 24 adapted to be fitted with the printed circuit board 2 and with spaces 18 adapted to accommodate various semiconductor elements 23 mounted on the printed circuit board 2. When the printed circuit board 2 is fitted to the card basic board 1 from the underside thereof and secured thereto, the predetermined number of the terminal portions 22 arranged in parallel along one side portion of the printed circuit board 2 locate in the corresponding contact spaces 14 of the card basic board 1.

As shown in FIG. 4, the cantilever contact 61 of the connector 6 has a tip portion bent so as to have substantially an S-shape. When the side end portion of the memory card 10 is inserted into an aperture 62 of the connector 6, the tip portion of each cantilever 61 passes through the corresponding inserting port 21 and the middle portion of the bent cantilever contact abuts the lower surface of the upper beam 11, whereby the contact is elastically pressed by the reaction force upon the terminal portion 22 of the printed circuit board 2.

Figure 7:
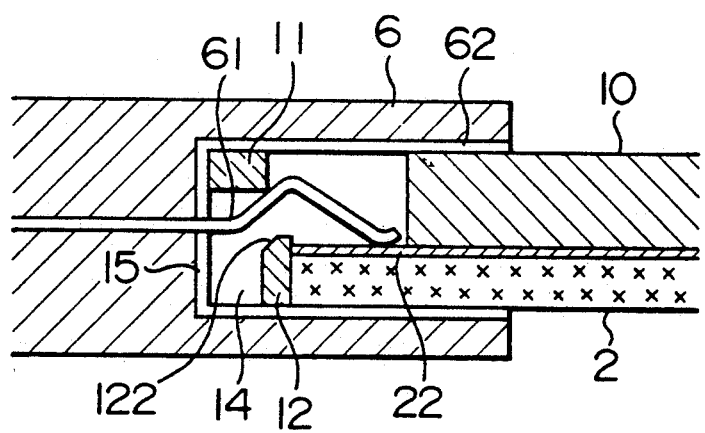

If the upper surface of the lower beam 12 is lower than the upper surface of the terminal portion 22. A risk exists that the terminal portion 22 separates from by the cantilever contact 61. Therefore, it is required that the upper surface of the lower beam 12 be located at a level equal to the upper surface of the terminal portion 22. However, in consideration of fabrication convenience, the lower beam 12 may be adapted to slightly project upwards beyond the upper surface of the terminal portion 22 as shown in FIG. 7 by a length which does not disturb the insertion of the cantilever contact onto the terminal portion 72.

By virtue of the above-mentioned structure according to the present invention, dusts or the like or other foreign matter adhering to the terminal portion can be easily removed by access through the upper opening, thereby assuring a close contact between the memory card and the connector for improving the memory cards operational reliability.

Further, by providing an upper beam near the upper opening and a lower beam near the inserting port opposing each other, the side end portion of the card basic board is mechanically strengthened. As a result, there is no fear that any deformation such as bending may be caused, and there may not be caused any separation of the conductive pattern, any faulty contact between the conductive pattern and the semiconductor elements, or any damage of the semiconductor elements.

What is claimed is:

1. A memory card comprising:
    a card basic board with upper and lower surfaces, formed with a broad recess on the lower surface thereof for receiving said printed circuit board therein;
    a printed circuit board having semiconductor elements provided thereon mounted into said recess;
    said card basic board being provided with a predetermined plurality of contact spaces communicating with said recess, wherein each of said contact spaces corresponds with one of said terminal portions of the printed circuit board;
    each of said contact spaces in said card basic board being formed with an upper opening along said upper surface of the bard basic board and a side opening for receiving a corresponding contact terminal of a connector to be inserted there through and in contact with a corresponding terminal portion;
    a predetermined plurality of upper beams, one of said upper beams provided between each of the plurality of upper openings and the side openings in said contact spaces; and
    a predetermined plurality of lower beams, one of said lower beams provided adjacent to each of corresponding side openings in said contact spaces.

2. The memory card as recited in claim 1, wherein each said lower beams being formed with a slant surface for directing a contactor toward the printed circuit board upon insertion in an apparatus.

3. The memory card as recited in claim 1, wherein the upper beam and the lower beam in each of said contact spaces are so arranged as not to overlap with each other when viewed from above.

4. The memory card as recited in claim 1, wherein the recess of said card basic board is formed accommodating spaces for accommodating electric parts mounted on said printed circuit board.

5. The memory card as recited in claim 1, wherein said lower beam in each of said contact spaces projects upwards beyond the upper surface of the terminal portion.

* * * * *